US006552455B1

(12) United States Patent
Otsuki et al.

(10) Patent No.: US 6,552,455 B1
(45) Date of Patent: Apr. 22, 2003

(54) HYDRODYNAMIC BEARING AND SPINDLE MOTOR

(75) Inventors: Makoto Otsuki, Itami (JP); Osamu Komura, Itami (JP); Kaoru Murabe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/720,202

(22) PCT Filed: Apr. 21, 2000

(86) PCT No.: PCT/JP00/02627

§ 371 (c)(1),
(2), (4) Date: Feb. 9, 2001

(87) PCT Pub. No.: WO00/65246

PCT Pub. Date: Nov. 2, 2000

(30) Foreign Application Priority Data

Apr. 22, 1999 (JP) .......................................... 11-114784

(51) Int. Cl.$^7$ .................................................. H02K 7/08
(52) U.S. Cl. ........................................... 310/90; 310/51
(58) Field of Search ................................ 310/90, 67 R, 310/51; 360/98.07, 99.08, 264.7, 266.4; 369/266; 384/114, 81

(56) References Cited

U.S. PATENT DOCUMENTS 5,089,732 A * 2/1992 Konno et al. ............. 310/67 R
5,224,782 A * 7/1993 Miwa et al. ................ 384/100
5,258,672 A * 11/1993 Wrobel ........................ 310/42
5,707,154 A * 1/1998 Ichiyama .................... 384/107
6,105,250 A * 8/2000 Tanaka et al. ........... 29/898.02
6,244,749 B1 * 6/2001 Nakagawa et al. ......... 384/114
6,322,252 B1 * 11/2001 Grantz et al. ............... 384/124

FOREIGN PATENT DOCUMENTS

JP 2-149784 6/1990
JP 3-73721 7/1991
JP 5-105192 4/1993
JP 5-332354 12/1993
JP 9-25930 1/1997
JP 2000-170749 6/2000

* cited by examiner

*Primary Examiner*—Nestor Ramirez
*Assistant Examiner*—Judson H. Jones
(74) *Attorney, Agent, or Firm*—McDermott, Will & Emery

(57) ABSTRACT

Provided is a durable spindle motor with a precise rotation but free from a shaft vibration, a decrease of rotation accuracy or a contact due to a swing during rotation. A shaft (11) is inclined relative to a sleeve (12) by an external biasing force, generating and then utilizing a hydrodynamic pressure generated during the rotation. The sleeve (12) has a central cylindrical section (C) extending parallel to the axis and two tapered sections (A), (B) each connect(d with the cylindrical section (C) at its opposite ends and enlarged outwardly, so that a dynamic force is generated between the tapered sections (A), (B) and the shaft (11). Preferably, an inclination of the tapered sections (A), (B) is identical to that of the shaft (11), and lengths of the tapered sections (A), (B) is one fourth of that of the sleeve (12). Similar advantages can be attained in an arrangement in which the sleeve (12) is defined in the form of cylinder while the shaft (11) is defined at its peripheral center with cylindrical section (c) and at its opposite ends with tapered sections (a), (b).

16 Claims, 6 Drawing Sheets

HYDRODYNAMIC BEARING AND SPINDLE MOTOR

TECHNICAL FIELD

The present invention relates to a bearing for use with a spindle motor, and a spindle motor having the bearing. The spindle motor is used for a memory apparatus such as hard disc drive and a polygon mirror drive apparatus for a bar code reader.

BACKGROUND

A bearing of the spindle motor for use with, for example, the memory apparatus and the polygon mirror drive apparatus needs a rotational stability, wear-resistance, and vibration-resistance. In particular, a relative inclination and thereby a contact between a shaft and a sleeve in the bearing result in an unstable rotation, which is seriously problematic and then (causes functional damages to the memory and drive apparatuses. A variety of techniques have been developed to avoid such problems.

Among other things, the Japanese Patent Publications Nos. 11/18357 (A) and 11/55918 (A) disclose a technique in which a stator and a rotor magnet are positioned eccentrically in order to force the shaft or sleeve of the bearing in a certain direction, thereby forming a stable rotation thereof.

FIG. 7 shows an example of disclosed in the Japanese Patent Publication JP 11/55918 (A). In the drawing, the stator has a plurality of blades 1 extending radially. Provided around the stator is a rotor 2. The rotor 2 supports a rotor magnet 3 on an inner periphery thereof. A certain gap is defined between the rotor magnet 2 and the blades 1. Each blade 1 has a coil (not shown) wound therearound. Therefore, an application of a voltage to the coils causes a relative rotation between the blades 1 and the rotor magnet 3.

In the drawing, one blade 1*a* of the stator is designed so that it has a shorter radial length than those of remaining blades 1. This forms a gap h1 between the blade 1*a* and the rotor magnet 3, which is greater than gap is h2 between the remaining blades 1 and the rotor magnet 3. Due to this, an attraction force (or repellent force) between the blade 1*a* and the rotor magnet 3 is reduced at this portion, which forces the rotor 2 in that direction.

In the motor disclosed in Japanese Patent Publication No. 11/55918 (A), in order to force the shaft toward the sleeve in a parallel fashion, a position where the stator and the rotor magnet oppose to each other should be positioned at about the center of the bearing with respect to an axial direction thereof. This arrangement is hardly realized due to design restrictions of the bearing.

FIG. 8 illustrates a spindle motor disclosed in the Japanese Utility Model Publication No. 55/36456 (A). The spindle motor has a bearing with a sleeve 4 and a shaft 5 that rotates about the sleeve. The shaft 5 securely holds a rotor 6 to which a magnetic member 7 in the form of ring is mounted. A housing that securely holds the sleeve 4 is provided with a magnet 8 at a portion thereof facing the magnetic member. The magnet 8 attracts or repels the magnetic member, causing the rotor 6 and the shaft 5 to be inclined against the sleeve 4 in one direction during rotation.

The bearing of the spindle motor disclosed in the Japanese Utility Model Publication No. 55/36456 (A) results in that only the distal end of the shaft 5 supported by the sleeve 4 contacts with the sleeve. This wears the specific portions of the sleeve 4 and the shaft 5, which reduces a durability of the bearing.

FIG. 9 illustrates another bearing disclosed in the Japanese Patent Publication No. 11/37157. In this bearing, a shaft 9 is inserted in a sleeve 10 to form the bearing. An inner peripheral surface of the sleeve 10 is formed with tapered sections so that at each tapered section an inner diameter of the sleeve is enlarged from the center of the sleeve toward the its end with respect to the axial direction.

The bearing disclosed in the JP No. 11/37157 (A) aims to prevent a possible leakage of lubricant in the lubricated bearing. Another tearing (not shown) is provided for the shaft 9, causing the shaft 9 to be supported at its opposite ends by the bearing shown and another bearing not shown. This means that the bearing disclosed does not correspond to a bearing according to the present invention in which a shaft or a sleeve is rotated while one is inclined relative to each other with respect to an axis of the bearing.

In sum, conventionally various bearings have been disclosed in which the shaft or sleeve is rotated while either of which is inclined relative to each other in one direction in order to stabilize the rotation of the spindle motor. Each of the hearings, however, has a problem that the shaft makes a contact at its end and thereby the durability of the bearing is reduced. The wearing of the shaft and sleeve can not be solved effectively even with the existence of chamfered portions formed at the opposite ends of the shaft. Therefore, another technique has been desired to solve those problems.

DISCLOSURE OF THE INVENTION

An object of the present invention is to provide a bearing that eliminates disadvantages in the conventional techniques, attains a stable rotation, hardly be influenced by an external swing, and has an improved durability. Further, another object of the present invention is to provide a simple structure and reliable spindle motor.

To overcome the problem, the present invention either shaft or sleeve is rotated relative to the other while it is inclined to the other, causing a higher hydrodynamic pressure at certain portions of the bearing and, by the use of the hydrodynamic pressure, to realize a stable rotation.

Specifically, in a first embodiment of the present invention a bearing for a spindle motor, includes a shaft and a sleeve in which the shaft is inserted. The sleeve has three bearing sections, a section A extending a distance of L1 from one end thereof in an axial direction, a section B extending a distance of L2 from the opposite end thereof in the axial direction of the bearing, and a section C extending a distance of L3 between sections A and B. Each of sections A and B has a tapered surface portion formed therein in which an inner diameter thereof is increased from inside to outside of the bearing. The section C has a cylindrical surface portion formed therein and extending substantially parallel to the axial direction. An inclination of the tapered surface portion of the sections A and B is defined by "f/L3", wherein "f" is determined as a gap between an inner surface of section C of the sleeve and an outer surface of the shaft in section C in a condition where the shaft is inclined relative to the sleeve.

In another embodiment of the present invention, a bearing for a spindle motor includes a shaft and a sleeve in which the shaft is inserted. An outer surface portion of the shaft that opposes an inner surface portion of the sleeve and thereby defines a bearing portion of the bearing is formed by three sequential sections, a section (a) extending a distance of L1 from a point that opposes one end of the sleeve in an axial direction thereof, a section (b) extending a distance of L2 from a point that opposes the opposite end of the sleeve in the axial direction, and a section (c) extending a distance of L3 and connecting sections (a) and (b). The intermediate section (c) has a cylindrical surface portion formed therein and extending substantially parallel to an axial direction thereof. Each of sections (a) and (b) has a tapered surface portion formed therein in which an outer diameter thereof is decreased continuously in a direction away from section (c). An inclination of the tapered surface portion of sections (a) and (b) is defined by "f/L3", wherein "f" is determined as a gap between an outer surface of the section (c) of the shaft and an inner surface of the sleeve in section (c) with respect to an axial direction of the axial direction of the sleeve, in a condition where the shaft is inclined relative to the sleeve.

Another aspect of the embodiment according to the present invention is directed to a hydrodynamic bearing in which either of the shaft or sleeve rotates while it is biased by an external force and then inclined toward a certain direction, relative to the other with an inclination of "f/L3".

Another aspect of the embodiment according to the present invention is directed to a hydrodynamic bearing in which the inclination of the shaft relative to the sleeve is equal to or less than 0.05 degrees.

Another aspect of the embodiment according to the is present invention is directed to bearing in which, when assumed that the bearing portion has a length of L which is the sum of L1, L2, and L3, the lengths L1 and L2 satisfy following relations:

$L1/L \geqq 1/4$ $L2/L \geqq 1/4$ $L \geqq L1+L2 \geqq L/2$

Another aspect of the embodiment according to the present invention is directed to a bearing in which the biasing force is generated by a ring-like magnet eccentrically arranged on an upper surface of the sleeve and another ring-like magnet mounted around the shaft so that the magnets repel to each other.

Another aspect of the embodiment according to the present invention is directed to a bearing in which either or both of the shaft and the sleeve are made of ceramic.

Another aspect of the embodiment according to the present invention is directed to a spindle motor with any one of the above described hydrodynamic bearings.

Another aspect of the embodiment according to the present invention is directed to a spindle motor in which the stator for driving the spindle motor includes a plurality of blades, one of the blades being designed so that, with respect to a rotational axis, an upper end thereof is longer than a lower end thereof, another of the blade positioned on opposite side with respect to the rotational axis being designed so that a lower end thereof is longer than an upper end thereof.

With the embodiments of the present invention, the shaft and sleeve close to each other at the opposite sides with respect to the axial direction and thereby generate a higher hydrodynamic pressure at the close points, realizing a stable rotation without any shaft vibrations.

In the bearing of the present invention, portions of the sleeve and shaft that generate higher hydrodynamic pressure have a sufficient length and therefore, by the use of the bearing of the present invention, a spindle motor with a vibration resistance, long lifetime, and high reliability can be obtained.

Also, by the use of the biasing means for inclining the shaft relative to the sleeve, a stable biasing force is attained. With this means, a spindle motor with a simple structure and a high reliability can be obtained.

Further, the shaft and/or sleeve of the bearing is made of ceramic, which allows to provide a bearing and a spindle motor with the bearing, both having an increased durability and a small size.

PREFERRED EMBODIMENTS OF THE INVENTION

Figure 1:
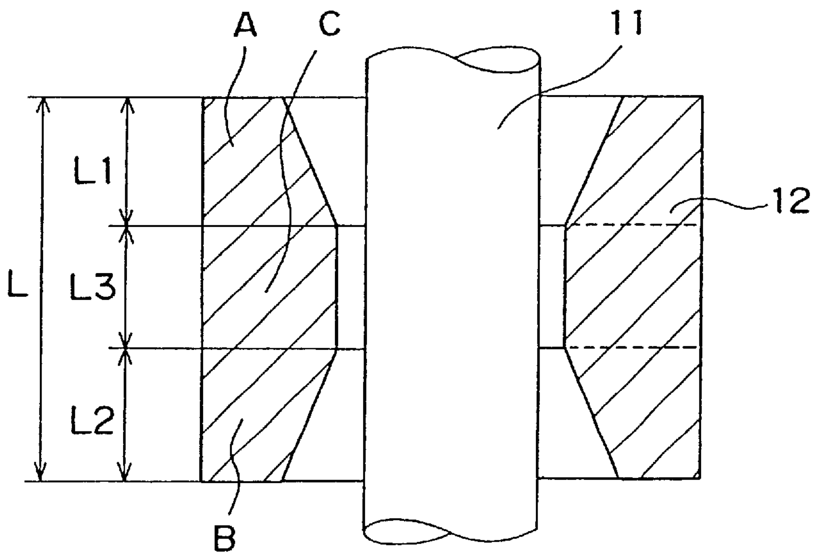
FIG. 1 is a cross sectional view of a bearing of the first embodiment in accordance with the present invention.

With reference to the drawings, a first embodiment of the present invention will be described. FIG. 1 illustrates a bearing in accordance with the present invention. As shown in the drawing, a shaft 1 is inserted in a sleeve 12 to form a bearing so that the shaft 1 or the sleeve 12 rotates relative to the other. The sleeve 12 has a tapered section A forming a part of an inner periphery and extending a distance of L1 from an upper end of the sleeve in the drawing. In this tapered section A, an inner diameter is enlarged continuously from inside to upward along a longitudinal axis of the bearing. Likewise, the sleeve 12 has another tapered section B forming another part of the inner periphery thereof and extending a distance of L2 from a lower end of the sleeve. In this tapered section B, an inner diameter is enlarged continuously from inside to downward along the longitudinal axis. A central section C forming another part of the inner periphery of the sleeve 12 which connects between the tapered sections A and B, is defined with a cylindrical surface that extends a distance 13 substantially parallel to the longitudinal axis.

Figure 2:
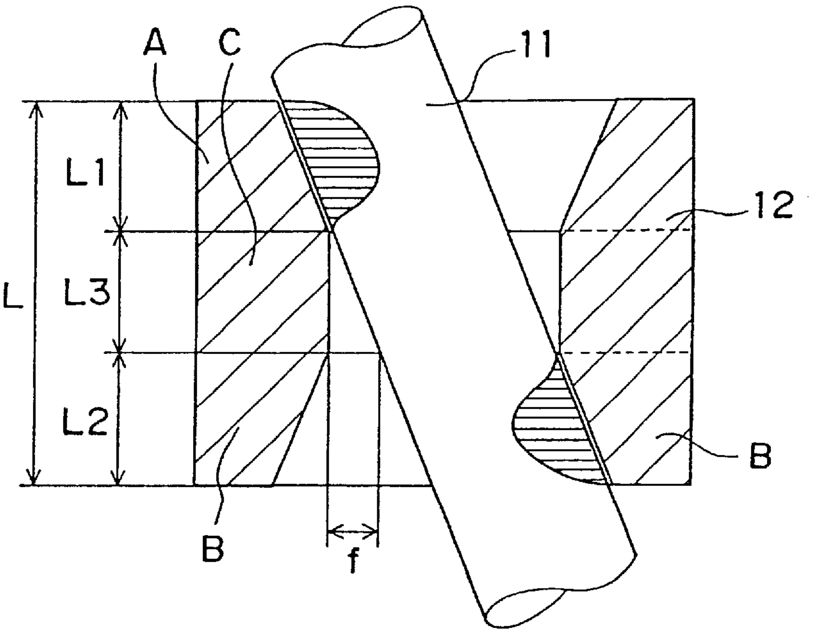
FIG. 2 is a cross sectional view, showing a rotational state of the bearing shown in FIG. 1.

FIG. 2 shows the bearing illustrated in FIG. 1 in a rotational state thereof. In the drawing, the shaft 11 is inclined relative to the sleeve 12 due to an external force described hereinafter. In the illustrated embodiment the shaft 11 is inclined so that it faces an upper left part of the section A of the sleeve 12 in the drawing and an lower right part of the section B of the sleeve 12. In general, a hydrodynamic pressure generated in a gap between the sleeve 12 and the shaft 11 rotating relative to the sleeve 12 increases with the decrease of the gap. Then, in the embodiment shown in the drawing, an increased hydrodynamic pressure is generated at the upper left part of the section A and the lower right part of the section B, which allows the shaft 11 to rotate relative to the sleeve 12 without any contact with the sleeve 12.

In order to stabilize the hydrodynamic pressure and then minimize a vibration of the shaft of the motor, the shaft 11 should be maintained in the inclined condition relative to the sleeve 12. Also, the gaps at the upper left part of the section A and the lower right part of the section B should be maintained as small as possible. Further, to increase the hydrodynamic pressure, opposing surface portions of the shaft 11 aid the sleeve 12 near the upper left part of the section A and the lower right part of the section B should be positioned parallel to each other. Besides, each of the opposing surface portions should have a certain length.

In the state shown in FIG. 2, when a distance between the section C of the sleeve 12 and the opposing portion of the shaft 11 in a radial direction or a direction perpendicular to the inner surface of the sleeve 12 is "f", an inclination of the shaft 11 relative to the sleeve 12 is indicated by "f/L3". This means that the tapered sections A and B of the sleeve 12 are designed to have an inclination that is equal to the inclination of the shaft 11, which allows the sections A and B of the sleeve 12 to extend parallel to the opposing inner peripheral surface portions of the sleeve 12. Preferably, the lengths L1 and L2 of the sections A and B, respectively, are greater than one fourth of the longitudinal length L (=L1+L2+L3) of the sleeve 12 in order to obtain a sufficient hydrodynamic pressure.

In FIG. 2, regions hatched by transverse parallel lines in the shaft 11, adjacent to the sections A and B of the sleeve 12 indicate distributions of the hydrodynamic pressures obtained through experiments conducted by the inventors. In the experiments, conditions were determined as follows:

| | | |
|---|---|---|
| Length L1, L2, L3 | 4 | mm, |
| Distance f | 4 | μm, |
| Inclination | 0.029 | degree, |
| Outer diameter of shaft | 8 | min, and |
| Rotational number | 12,000 | rpm. |

With the condition, the shaft 11 rotated in a stable fashion while it was inclined relative to the sleeve.

As described above, in the previous embodiment, the inner peripheral surface of the sleeve 12 is defined by three bearing sections: tapered sections A and B and cylindrical section C; however, it may be defined only by two inwardly tapered sections without having the cylindrical section C, i.e., by setting the length L3 zero. This arrangement also attains the similar advantages. Preferably, the relative inclination of the shaft 11 relative to the sleeve 12 is equal to or less than 0.05 degrees because an excessive inclination will decrease the hydrodynamic pressure.

Figure 3:
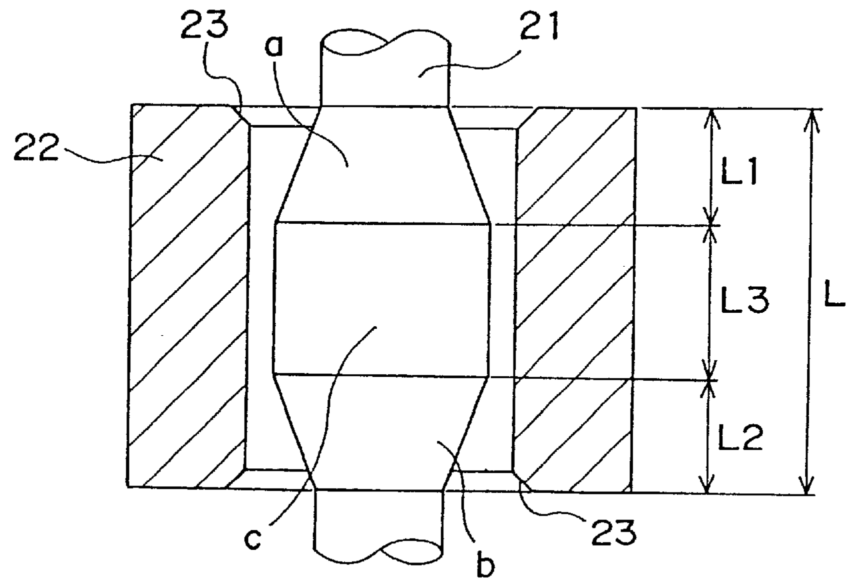
FIG. 3 is a cross sectional view of another embodiment in accordance with the present invention.

Next, a second embodiment of the present invention will be described with reference to the drawings. FIG. 3 shows a bearing according lo the second embodiment. In the drawing, a shaft 21 is inserted in a sleeve 22 to define the bearing, which allows the shaft or sleeve to rotate relative to the other. An outer peripheral portion of the sleeve 21, i.e., section (a) defining a part of the bearing and extending a distance of L1 from the top end of the bearing in the drawing, is formed with a tapered section in which an outer diameter of the shaft decreases from inside to upward along the longitudinal axis. Likewise, another outer peripheral portion of the sleeve 21, i.e., section (b) defining another part of the bearing and extending a distance of L2 from the bottom end of the bearing in the drawing, is forced with another tapered section in which an outer diameter of the shaft decreases from inside to downward along the longitudinal axis. A central outer peripheral portion or section (c) of the shaft 21, connecting between the sections, (a) and (b), is formed with a cylindrical surface extending a distance of L3 and substantially parallel to the longitudinal axis.

Figure 4:
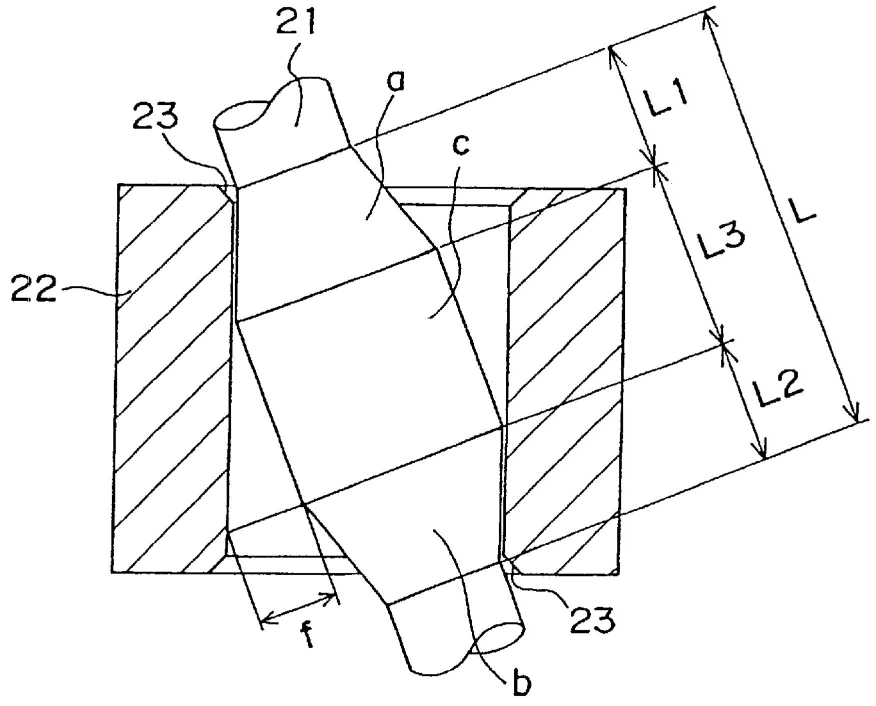
FIG. 4 is a cross sectional view, showing a rotational state of the bearing shown in FIG. 3.

FIG. 4 shows the bearing illustrated in FIG. 3 in a rotational state thereof. In the drawing, the shaft 21 or sleeve 22 is inclined relative to the other due to an external force described below. In the drawing, the shaft 21 is inclined so that a upper left part of the section (a) and a lower right part of the section (b) take respective positions adjacent to the sleeve 22. As described above, in general a greater hydrodynamic pressure is generated in the gap between the rotating shaft 21 and the sleeve 22 as the gap decreases. Then, in the embodiment shown a higher hydrodynamic pressure is created at the upper left and lower right parts of the sections (a) and (b), respectively. This maintains the rotation of tie shaft 21 or sleeve 22 without any contact between them.

In order to stabilize the hydrodynamic pressure and minimize the vibration of the shaft of the motor, it is desirable to maintain the inclination of the shaft 21 or the sleeve relative to the other and also the gaps at the upper left and lower right parts (a) and (b) as small as possible. Further, to increase the hydrodynamic pressure, it is desirable that the opposing surface portions of the shaft 21 and the sleeve 22 extend parallel to each other in the vicinity of the upper left part (a) and the lower right part (b) and also the opposing surface portions have a predetermined length.

In the state shown in FIG. 4, when a distance between the section (c) of the sleeve 12 and the opposing section of the shaft 21 in a radial direction or a direction perpendicular to the inner surface of the sleeve 22 is "f", the inclination of the shaft 21 relative to the sleeve 22 is indicated by "f/L3". This means that the tapered sections (a) and (b) of the sleeve 22 are designed to have an inclination "f/L3" that is equal to the inclination of the shaft 21, which allows the sections (a) and (b) of the sleeve 22 to extend parallel to the opposing inner peripheral surface portions of the sleeve 22. Preferably, the lengths L1 and L2 of the sections (a) and (b) are greater than one fourth of the longitudinal length L (=L1+L2+L3) of the bearing section of the sleeve 12 in order to obtain a sufficient hydrodynamic pressure.

The arrangement described above results in various advantages similar to those obtained in the first embodiment. It should be noted teat in FIGS. 3 and 4 the sleeve 22 is formed with chamfered portions 23 at the top and bottom ends of its inner periphery in order to prevent an interference between the shaft 21 and the sleeve 22. Instead of such chamfered sections 23, the tapered sections (a) and (b) of the shaft 21 may be extended upward and downward to a certain extent.

Similar to the first embodiment, the shaft 21 has three bearing sections: tapered sections (a) and (b) and cylindrical section (c); however, it may be defined only by two outwardly tapered sections without having the cylindrical section C, i.e., with setting the length L3 zero. This arrangement also attains the similar advantages. Preferably, the relative inclination of the shaft 21 and the sleeve 22 is equal to or less than 0.05 degrees because an excessive inclination will decrease the hydrodynamic pressure.

Figure 5:
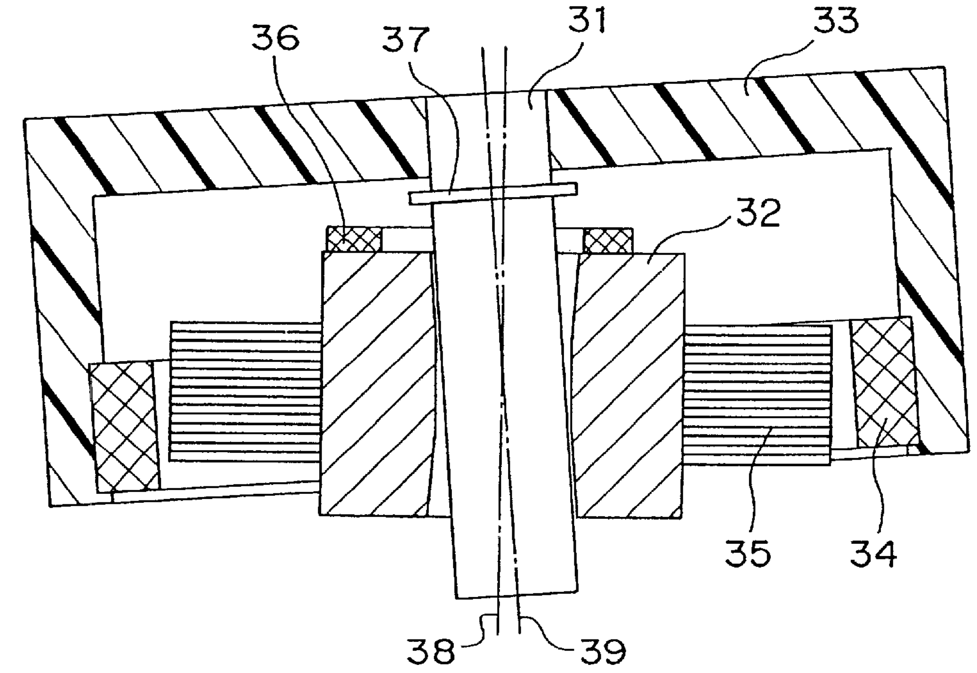
FIG. 5 is a cross sectional view, showing means for forcing a shaft in an inclined condition relative to a sleeve.

Next, a third embodiment of the present invention will be described with reference to the drawings. FIG. 5 shows a spindle motor with the hydrodynamic bearing of the present invention. This embodiment relates to another means for forcing to incline the shaft or sleeve relative to the other in a certain direction. In the drawing, a shaft 31 is rotatably inserted in a sleeve 32 so that they define a bearing. The shaft 31 supports a rotor 33. The rotor 33 securely holds a rotor magnet 34 which opposes a stator 35 leaving a certain gap therebetween. The stator 35 has a coil wound therearound.

The sleeve 32 holds a ring-like magnet 36 on the top surface thereof. Also, an axis of the magnet 36 is positioned in an eccentric fashion with an axis of the sleeve 32. The shaft 31 holds a ring-like magnet 37 so that the magnet 37 faces the magnet 36. In this instance, the magnets 36 and 37 are positioned so that they repel against the other.

In operation of the spindle motor so constructed, when an electric current is applied to a coil (not shown) wound around stator 35, an attraction (or repellent) force is generated between the stator 35 and the rotor magnet 34. This causes the rotor 33 with the rotor magnet 34 to rotate together with the shaft 31 relative to the sleeve 32. The rotor 33 and the sleeve 32 are maintained out of contact with each other by the repellent force generated by the magnets 36 and 37. At this moment, since the axis of the magnet 36 is eccentrically arranged and therefore a greater repellent force occurs on the side where the magnet 36 closes more to the magnet 37. Then, on this side the magnets 36 and 37 are subject to the force that moves them away from the other. Accordingly, a force is generated to incline the rotor 33 and the shaft 31 and thereby they rotate in this inclined condition. It should be noted that the reference numeral 38 indicates the axis of the sleeve 32, and the reference numeral 39 indicates the central axis of the shaft in the condition where the shaft 31 is inclined.

In the illustrated spindle motor in FIG. 5, the bearing unit has the bearing described in the first embodiment in which the sleeve 32 is provided at its opposite ends of the inner periphery with inwardly tapered sections. In this instance, due to the force described above the shaft 31 rotates while it is inclined to generate the dynamic forces at the close portions between the shaft 31 and the sleeve 32. The generated dynamic force balances with the repellent force generated by the magnets, which realizes a stable rotation. It should be noted that the bearing may be the one in which he tapered sections are provided for the shaft as shown in the second embodiment.

It should be noted that, although a combination of the eccentrically arranged magnets 36 and 37 is provided on the upper side of the sleeve 32 in the drawing, it may be provided on the lower side of the sleeve 32. Alternatively, the combination may be provided on opposite sides of the sleeve. In this instance, an eccentric direction of one combination should be turned 180 degrees relative to the other.

Figure 6:
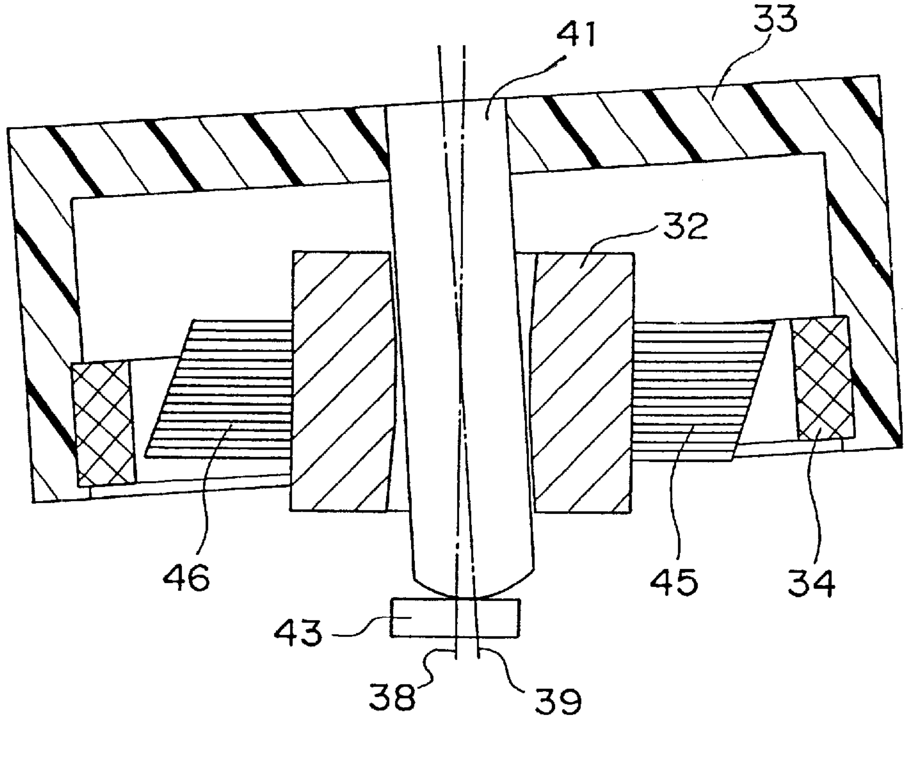
FIG. 6 is a cross sectional view, showing another means for forcing a shaft in an inclined condition relative to a sleeve.
Figure 7:
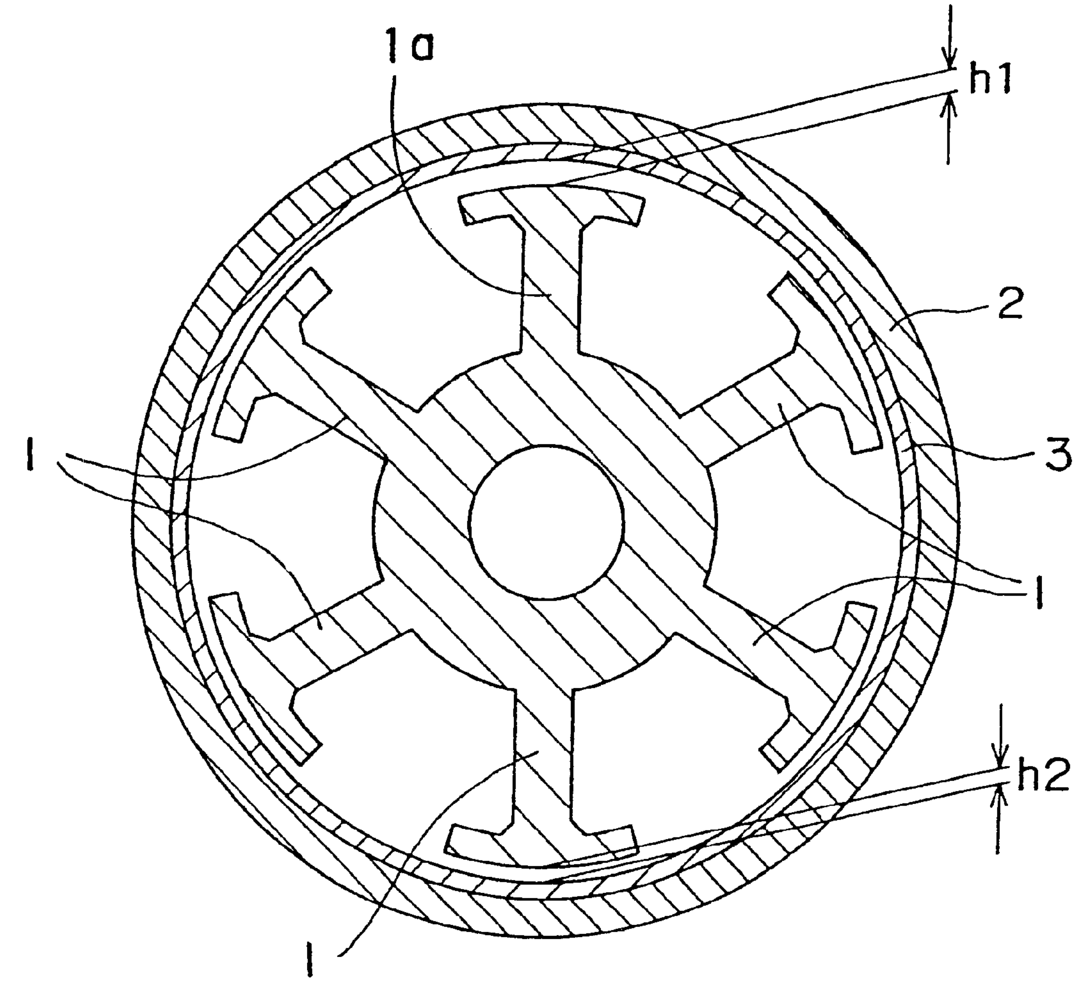
FIG. 7 is a transverse sectional view of the conventional bearing.
Figure 8:
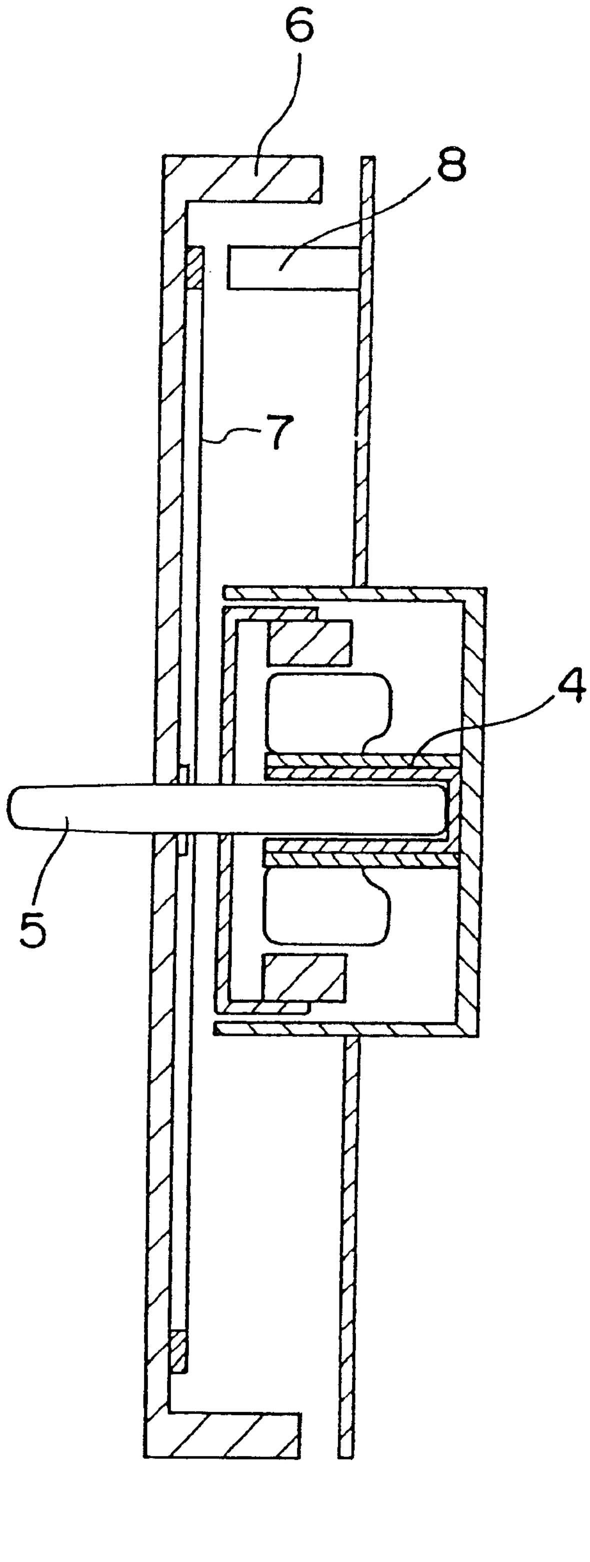
FIG. 8 is a longitudinal sectional view of another conventional bearing.
Figure 9:
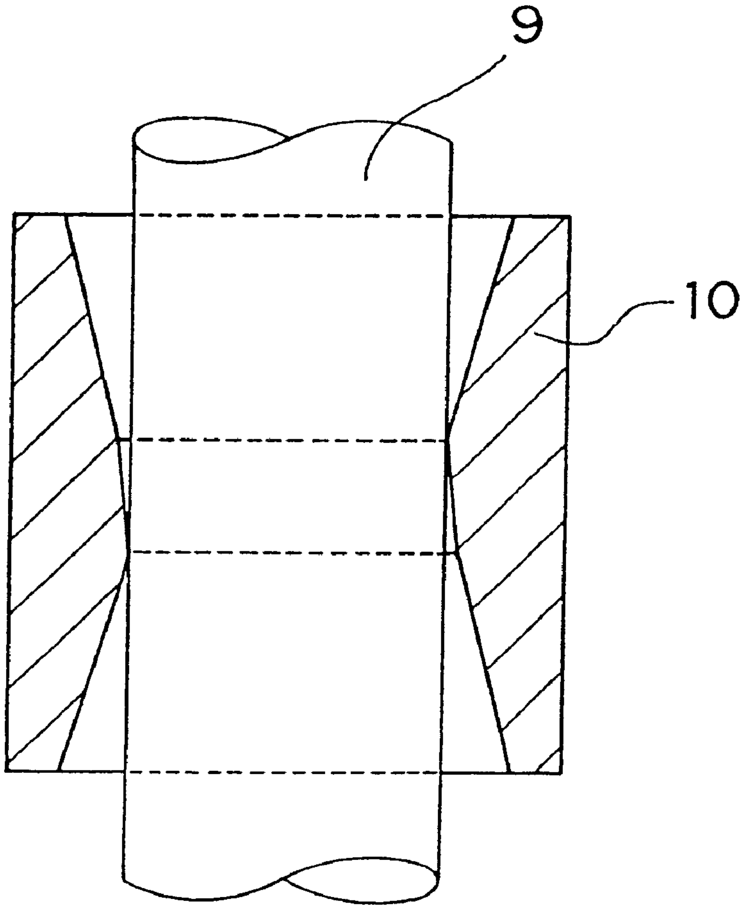
FIG. 9 is a longitudinal sectional view of another conventional bearing.

Next, the fourth embodiment of the present invention will be described with reference to the drawings. FIG. 6 shows a spindle motor of this embodiment. This embodiment relates to another means for forcing to incline the shaft or sleeve relative to the other in a certain direction. In FIG. 6, like members are designated by like reference numerals and the operation of the spindle motor is similar to that of the third embodiment.

According to this embodiment, the repellent force that is generated by the two magnets in the third embodiment does not act in the thrust direction. Instead, the shaft 41 is supported at its lower end by a thrust bearing 43. The thrust bearing 43 may be a thrust hydrodynamic bearing.

In FIG. 6, a blade 45 of the stator shown on the right side of the drawing is formed so that its upper portion is longer than its lover portion. Contrary, another blade 46 positioned on the opposite left side and symmetrically with the blade 45 with respect to the axis is formed so that its upper portions shorter than its lower portion. When a certain bias is applied to coils each wound around blades of the stator so arranged, a portion of the rotor magnet 34 that opposes to the blade 45 is subject to a greater attraction force at its upper part. Also, another part thereof that opposes to the opposite blade 46 is subject to a greater attraction force at its lower part. The greater attraction forces at respective portions act as a biasing force that inclines the rotor 33 and the shaft 41 relative to the sleeve 32. In FIG. 6, the reference numeral indicates the central axis of the sleeve 32, and the reference numeral 39 indicates the central axis of the shaft 41. By using the biasing force and the dynamic force generated by the shaft 41 and the sleeve 32, a stable rotation of the spindle is realized. Although the bearing with the tapered sleeve shown in the first embodiment is illustrated in the drawing, it may be the one with the tapered shaft shown in the second embodiment.

In each of the embodiments described above, either or both of the shaft and sleeve may be made of ceramic which is superior in a rigidity and durability, which allows to provide a durable, compact and light-weighted bearing.

What is claimed is:

1. A hydrodynamic bearing for a spindle motor, comprising:

a shaft; and a sleeve in which said shaft is inserted;

wherein said sleeve has three bearing sections, a section A extending a distance of L1 from one end thereof in an axial direction of said bearing, a section B extending a distance of L2 from the opposite end thereof in said axial direction, and a section C extending a distance of L3 between said sections A and B, each of said sections A and B has a tapered surface portion formed therein in which an inner diameter thereof is increased from inside to outside of said bearing, said section C has a cylindrical surface portion formed therein and extending substantially parallel to said axial direction, and an inclination of said tapered surface portion of said sections A and B is defined by "f/L3", wherein "f" is determined as a gap between an inner surface of said section C of said sleeve and an outer surface of said shaft in said section C in a condition where said shaft is inclined relative to said sleeve.

2. A hydrodynamic bearing in accordance with claim 1, wherein either of said shaft or sleeve rotates while it is biased by an external force and then inclined toward a certain direction, relative to the other with an inclination of "f/L3".

3. A hydrodynamic bearing in accordance of claim 2, wherein said inclination of said shaft relative to said sleeve is equal to or less than 0.05 degrees.

4. A hydrodynamic bearing in accordance with claim 1, wherein when assumed that said bearing portion has a length of L which is the sum of L1, L2, and L3, said lengths L1 and L2 satisfy following relations:

$L1/L \geqq 1/4$, $L2/L \geqq 1/4$, and $L \geqq L1+L2 \geqq L/2$.

5. A hydrodynamic bearing in accordance with claim 2, wherein said biasing force is generated by a ring-like magnet eccentrically arranged on an upper surface of said sleeve and another ring-like magnet mounted around said shaft so that said magnets repel to each other.

6. A hydrodynamic bearing in accordance with claim 1, wherein either or both of said shaft and said sleeve are made of ceramic.

7. A hydrodynamic bearing for a spindle motor, comprising:

a shaft; and a sleeve in which said shaft is inserted;

wherein an outer surface portion of said shaft that opposes an inner surface portion of said sleeve and thereby defines a bearing portion of said bearing is formed by three sequential sections, a section (a) extending a distance of L1 from a point that opposes one end of said sleeve in an axial direction thereof, a section (b) extending a distance of L2 from a point that opposes the opposite end of said sleeve in said axial direction, and a section (c) extending a distance of L3 and connecting said sections (a) and (b), said intermediate section (c) has a cylindrical surface portion formed therein and extending substantially parallel to an axial direction thereof, each of said sections (a) and (b) has a tapered surface portion formed therein in which an outer diameter thereof is decreased continuously in a direction away from said section (c), and an inclination of said tapered surface portion of said portions (a) and (b) is defined by "f/L3", wherein "f" is determined as a gap between an outer surface of said section (c) of said shaft and an inner surface of said sleeve in said section (c) with respect to an axial direction of said axial direction of said sleeve, in a condition where said shaft is inclined relative to said sleeve.

8. A hydrodynamic bearing in accordance with claim 7, wherein either of said shaft or sleeve rotates while it is biased by an external force and then inclined toward a certain direction, relative to the other with an inclination of "f/L3".

9. A hydrodynamic bearing in accordance of claim 7, wherein said inclination of said shaft relative to said sleeve is equal to or less than 0.05 degrees.

10. A hydrodynamic bearing in accordance with claim 7, wherein when assumed that said bearing portion has a length of L which is the sum of L1, L2, and L3, said lengths L1 and L2 satisfy following relations:

$L1/L \geqq 1/4$, $L2/L \geqq 1/4$, and $L \geqq L1+L2 \geqq L/2$.

11. A hydrodynamic bearing in accordance with claim 7, wherein said biasing force is generated by a ring-like magnet eccentrically arranged on an upper surface of said sleeve and another ring-like magnet mounted around said shaft so that said magnets repel to each other.

12. A hydrodynamic bearing in accordance with claim 7, wherein either or both of said shaft and said sleeve are made of ceramic.

13. A spindle motor, comprising:

a hydrodynamic bearing, said bearing includes a shaft; and a sleeve in which said shaft is inserted;

wherein said sleeve has three bearing sections, a section A extending a distance of L1 from one end thereof in an axial direction of said bearing, a section B extending a distance of L2 from the opposite end thereof in said axial direction, and a section C extending a distance of L3 between said sections A and B, each of said sections A and B has a tapered surface portion formed therein in which an inner diameter thereof is increased from inside to outside of said bearing, said section C has a cylindrical surface portion formed therein and extending substantially parallel to said axial direction, and an inclination of said tapered surface portion of said sections A and B is defined by "f/L3", wherein "f" is determined as a gap between an inner surface of said section C of said sleeve and an outer surface of said shaft in said section C in a condition where said shaft is inclined relative to said sleeve.

14. A spindle motor in accordance with claim 13, wherein said stator for driving said spindle motor includes a plurality of blades, one of said blades being designed so that, with respect to a rotational axis, an upper end thereof is longer than a lower end thereof, another of said blade positioned on opposite side with respect to said rotational axis being designed so that a lower end thereof is longer than an upper end thereof.

15. A spindle motor, comprising:

a hydrodynamic bearing, said bearing includes a shaft; and a sleeve in which said shaft is inserted;

wherein an outer surface portion of said shaft that opposes an inner surface portion of said sleeve and thereby defines a bearing portion of said bearing is formed by three sequential sections, a section (a) extending a distance of L1 from a point that opposes one end of said sleeve in an axial direction thereof, a section (b) extending a distance of L2 from a point that opposes the opposite end of said sleeve in said axial direction, and a section (c) extending a distance of L3 and connecting sad sections (a) and (b), said intermediate section (c) has a cylindrical surface portion formed therein and extending substantially parallel to an axial direction thereof, each of said sections (a) and (b) has a tapered surface portion formed therein in which an outer diameter thereof is decreased continuously in a direction away from said section (c), and an inclination of said tapered surface portion of said portions A and B is defined by "f/L3", wherein "f" is determined as a gap between an outer surface of said section (c) of said shaft and an inner surface of said sleeve in said section (c) with respect to an axial direction of said axial direction of said sleeve, in a condition where said shaft is inclined relative to said sleeve.

16. A spindle motor in accordance with claim 15, wherein said stator for driving said spindle motor includes a plurality of blades, one of said blades being designed so that, with respect to a rotational axis, an upper end thereof is longer than a lower end thereof, another of said blade positioned on opposite side with respect to said rotational axis being designed so that a lower end thereof is longer than an upper end thereof.

* * * * *